(12) United States Patent
Campbell et al.

(10) Patent No.: US 11,347,025 B2
(45) Date of Patent: *May 31, 2022

(54) KINEMATIC MOUNT

(71) Applicant: Photon Valley, Inc., Lake Forest, CA (US)

(72) Inventors: James Campbell, Foothill Ranch, CA (US); Christopher Guerrero, Laguna Niguel, CA (US); Daniel Castro, Lake Forest, CA (US)

(73) Assignee: Photon Valley, Inc., Lake Forest, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 16/786,936

(22) Filed: Feb. 10, 2020

(65) Prior Publication Data

US 2021/0247590 A1 Aug. 12, 2021

(51) Int. Cl.
| A47G 1/02 | (2006.01) |
| G02B 7/182 | (2021.01) |
| F16M 13/02 | (2006.01) |
| F16C 11/10 | (2006.01) |

(52) U.S. Cl.
CPC ............... *G02B 7/182* (2013.01); *A47G 1/02* (2013.01); *F16C 11/106* (2013.01); *F16M 13/022* (2013.01); *F16M 2200/022* (2013.01)

(58) Field of Classification Search
CPC ......... G02B 7/182; A47G 1/02; F16C 11/106; F16M 11/12; F16M 13/022; F16M 2200/021; F16M 2200/022

USPC .......... 248/481; 359/819, 871, 872
See application file for complete search history.

(56) References Cited

U.S. PATENT DOCUMENTS

| 4,863,243 | A | * | 9/1989 | Wakefield | ............ | G02B 7/1825 |
| | | | | | | 359/896 |
| 5,737,132 | A | * | 4/1998 | Luecke | ................ | G02B 7/1825 |
| | | | | | | 359/819 |
| 6,053,469 | A | * | 4/2000 | Burgarella | ............. | G02B 7/023 |
| | | | | | | 248/476 |

(Continued)

FOREIGN PATENT DOCUMENTS

WO 2019164686 A1 8/2019

OTHER PUBLICATIONS

Edmund Optics; https://www.edmundoptios.com/c/optical-mirror-mounts/682/#; downloaded Feb. 10, 2020.

(Continued)

*Primary Examiner* — Todd M Epps
(74) *Attorney, Agent, or Firm* — Lynch LLP; Sean Lynch

(57) ABSTRACT

Kinematic mounts disclosed in this application are made from three main components: a housing, a footing, and a tightening mechanism. The tightening mechanism includes three parts: a top portion, a bottom portion, and a locking interface mechanism. When the top portion, which includes a hollow tip with interior threading, is screwed down onto the bottom portion, which includes a threaded tip, the locking interface component is pressed against at least one interior surface of the housing that causes the housing to be pressed against the footing. This action holds the housing in place relative to the footing while simultaneously preventing unwanted movement of the housing during tightening.

15 Claims, 3 Drawing Sheets

(56) References Cited

U.S. PATENT DOCUMENTS

| | | | |
|---|---|---|---|
| 6,411,447 B1* | 6/2002 | Hilbert | G02B 7/1825 |
| | | | 359/819 |
| 7,421,918 B2 | 9/2008 | Cable | |
| 11,029,485 B2* | 6/2021 | DeWitt, IV | G02B 7/023 |
| 2008/0219756 A1 | 9/2008 | Grant | |
| 2021/0244203 A1* | 8/2021 | Campbell | G02B 7/198 |
| 2021/0270416 A1* | 9/2021 | Campbell | G02B 7/003 |

OTHER PUBLICATIONS

Thorlabs; https://www.thorlabs.com/navigation.cfm?guide_id=71; downloaded Feb. 10, 2020.

Newport Corporation; https://www.newport.com/c/optical-mounts; downloaded Feb. 10, 2020.

* cited by examiner

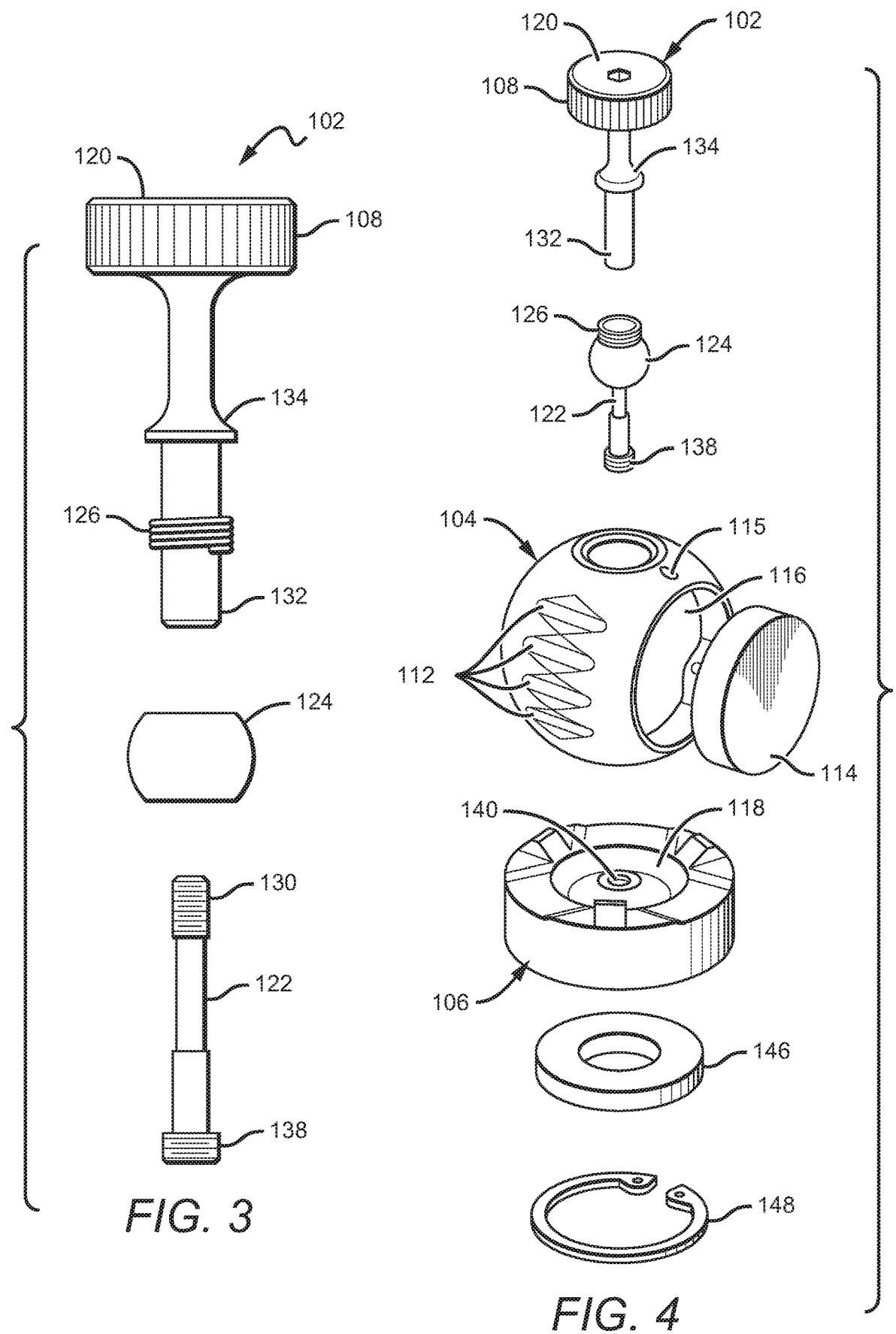

KINEMATIC MOUNT

FIELD OF THE INVENTION

The field of the invention is kinematic mounts.

BACKGROUND

The background description includes information that may be useful in understanding the present invention. It is not an admission that any of the information provided in this application is prior art or relevant to the presently claimed invention, or that any publication specifically or implicitly referenced is prior art.

The world of kinematic mounts, especially in the context of optics and laser optics, has been relatively untouched by recent innovation. Existing products intended to, e.g., hold a mirror in place on a laser prototyping board all use the same general form factor: a mirror is held in place by a kinematic mount that has several screws, where each screw can be turned to effect a change in the orientation of the mirror in the kinematic mount.

Within the industry, such companies as Thorlabs, Edmond Optics, and Newport Corporation all produce this style of kinematic mount. None of these companies have considered improvements to this configuration that can be achieved through a complete rethinking of the state of the art.

Although those industry players represent what is currently on sale, patents can give us an idea of what has been contemplated even if the inventions in those patents have never been brought to market. In searching through related patents, it is clear there have been attempts to improve on the state of the art, though patents in this field similarly focus on mere incremental improvements, and thus fail to consider different form factors and mechanisms that can be combined to create a dramatically improved kinematic mount. For example, U.S. Pat. No. 4,863,243 is directed to what is best described as an overly complicated device that takes on the same appearance as all other kinematic mounts that currently exist. This reference fails to consider a spherical or semi-spherical mount having a new locking mechanism that prevents orientation interference during the locking process.

U.S. Pat. No. 5,737,132 discloses a similarly out-of-date concept. It describes a kinematic mount with a status quo form factor and fails to consider a spherical or semi-spherical mount, lacking in also in any kind of innovative new locking mechanism. Finally, U.S. Pat. No. 7,421,918 contemplates yet another kinematic mount that fails to deviate from the status quo. Such incremental improvements necessarily fail to re-imagine kinematic mounts and thus fail to contemplate the benefits of innovation in this space.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

Thus, there is still a need in the art for innovative new kinematic mounts, especially in the area of laser optics.

SUMMARY OF THE INVENTION

The present invention provides apparatus, systems, and methods directed to kinematic mounts, e.g., for use in optics and laser prototyping. In one aspect of the inventive subject matter, a kinematic mount is contemplated to comprise: a housing having a curved outer surface on at least a bottom portion of the housing, and further comprising a housing through hole; a footing comprising a cradle that is sized and dimensioned for the curved outer surface of the housing to rest within the cradle; a tightening mechanism disposed at least partially within the housing through hole, where the tightening mechanism has a top portion, a bottom portion, a locking interface component, and a compression spring. The tightening mechanism is configured to hold the housing in place relative to the footing upon tightening the top portion to the bottom portion while the spring and the locking interface component are disposed on the top portion such that the locking interface component contacts both the top portion and an interior surface of the housing to apply pressure on the interior surface toward the footing.

In some embodiments, the locking interface component comprises a curved outer surface. The top portion can include a hollow tip with internal threading and the bottom portion can thus include a threaded tip configured to screw into the hollow tip. In some embodiments, these are reversed (the bottom portion has a hollow tip and the top portion has external threading). In some embodiments, the top portion has a flared area between a first end and a second end, the flared area configured to apply force to the compression spring upon tightening the tightening mechanism.

In some embodiments, the compression spring is configured such that an inner diameter of the spring is greater than the outer diameter of the hollow tip, and wherein the spring is positioned between the flared portion and the locking interface component. The locking interface component can contact at least one interior surface of the housing as well as the compression spring. In some embodiments, the housing includes a space for a mirror.

In another aspect of the inventive subject matter, a kinematic housing is contemplated that includes: a housing with a curved outer surface on at least a bottom portion of the housing, where the housing has a through hole; a footing comprising a cradle that is sized and dimensioned for the curved outer surface of the housing to rest within the cradle; a tightening mechanism configured to fit within the housing through hole, where the tightening mechanism has a top portion, a bottom portion, a locking interface component, and a compression spring; the top portion having a hollow tip with internal threading and a flared portion between a first end and a second end of the top portion; the bottom portion comprising a threaded tip sized and dimensioned to couple with the internal threading of the hollow tip of the top portion; the locking interface component has a through hole having a diameter that is greater than an outer diameter of the hollow tip, and the locking interface component is placed on the hollow tip such that the hollow tip passes through it; the locking interface component contacts at least one interior surface of the housing; and the compression spring is configured such that an inner diameter of the spring is greater than the outer diameter of the hollow tip, and where the spring is positioned between the flared portion and the locking interface component.

In some embodiments, the top portion of the tightening mechanisms also includes a flared end to facilitate hand tightening. In some embodiments, the footing includes a through hole sized and dimensioned to allow the bottom portion to pass through it. The bottom portion can feature a flared end to hold it in place relative to the footing.

In some embodiments, the compression spring comprises a coil spring. The locking interface mechanism's outer surface can be curved, and, in some embodiments, it can be a portion of a sphere. The housing can additionally include a space for a mirror.

One should appreciate that the disclosed subject matter provides many advantageous technical effects including, among others, the ability to lock an orientation of the housing without affecting the housings orientation in the process of locking. Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 shows an exploded view of a tightening mechanism.

FIG. 4 shows an exploded view of the kinematic mount shown in FIG. 1.

DETAILED DESCRIPTION

Figure 1:
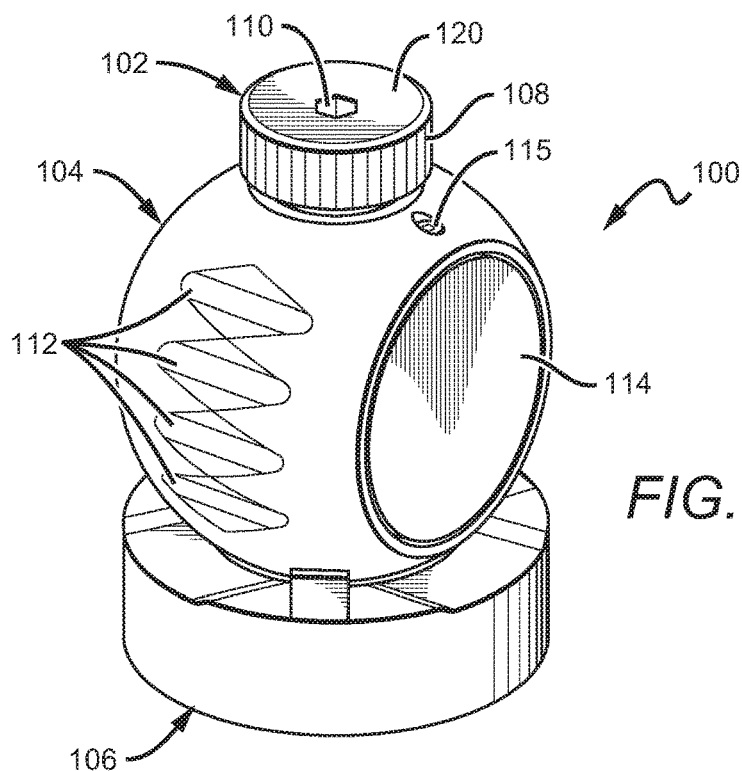
FIG. 1 shows a kinematic mount with a mirror disposed in the housing.

The following discussion provides example embodiments of the inventive subject matter. Although each embodiment may represent a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed. The inventors explicitly consider any combination of elements from any disclosed embodiment to be within the scope of the inventive subject matter.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities such as quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Kinematic mounts of the inventive subject matter include several different components that work together to create a mount that can be easily manually adjusted and subsequently tightened in place to prevent accidental readjustment. In many embodiments, such as the embodiments described below, these kinematic mounts are used to hold mirrors (e.g., a kinematic mirror mount), though in some embodiments, these same mounts can be configured to accommodate lasers, light sources, any type of reflector, etc. Once the mount is adjusted, it can be tightened to prevent unwanted movements. Mounts of the inventive subject matter are also designed such that tightening the mount does not cause any unwanted movement in the process of tightening. This application focuses on embodiments that hold mirrors, though embodiments holding other components (e.g., lasers, reflectors, light sources, etc.) do not deviate from the inventive subject matter.

FIG. 1 shows a kinematic mirror mount 100 of the inventive subject matter. The kinematic mirror mount 100 includes three main components: a tightening mechanism 102, a housing 104 and a footing 106. The tightening mechanism 102 is used to, upon turning, hold the housing 104 in a desired position. To facilitate hand tightening, the tightening mechanism 102 can include a textured surface 108 on a portion referred to as the tightening top 120 (e.g., ridges, a cross-hatched surface pattern, or some other textured feature such as rubber, plastic, or another high-friction material). These surface features make the tightening mechanism 102 easier to grip by hand. A slot 110, e.g., for a hex wrench, can be included on the top of the tightening mechanism 102 to facilitate tool tightening.

Housing 104 can be formed to have a mostly spherical shape. The mostly spherical shape allows the housing 104 to be rotated in any direction relative to the footing 106, which has a complementary concave shape (seen best in FIG. 4) to accommodate the housing 104. Housing 104 includes indentations 112 on its sides to make it easier for a user to grip its sides during repositioning. Indentations 112 can be included on both sides of the housing 104, and although indentations 112 are shown only on one side in the figures, similar indentations can appear on the opposite side without departing from the inventive subject matter. In some embodiments, only the bottom portion of the housing 104 is spherically shaped, allowing the rest of the housing (e.g., any portion of the housing that does not interact with the footing) to take on any form needed.

Housing 104 is configured to hold a mirror 114 or other reflective surface in a holding intrusion 116 (seen best in FIG. 4). Although described in this application as a mirror 114, embodiments of the inventive subject matter can hold any type of object that fits into the intrusion 116 (e.g., a dichroic mirror). A mirror or other object can be held in place by set screw 115.

Housing 104 rests within a footing 106. Footing 106 has a flat bottom surface so that the footing 106 can rest on a flat surface such as a laser prototyping board or a table. The footing 106, as seen best in FIGS. 2 and 4, has a top surface with a cradle 118 that is convex and complementary to the bottom of the housing 104. The cradle 118 shown in the figures is convex and spherical to allow the housing 104 to rotate about a center point (e.g., in embodiments where the portion of the housing that interacts with the footing that conforms to a spherical shape, it rotates about the center of curvature of the spherical portion of the housing). In some embodiments, the cradle 118 can comprise three or more contact points that the housing 102 can rest in, allowing the housing 102 to rotate relative to the cradle 118 without the footing including any curved surfaces at all. In some embodiments, the housing can have different shapes other than spherical to facilitate more restricted movements. For example, the housing can have a cylindrical bottom that fits into a complementary cylindrical cradle, allowing the housing to rotate only about a single axis.

Figure 2:
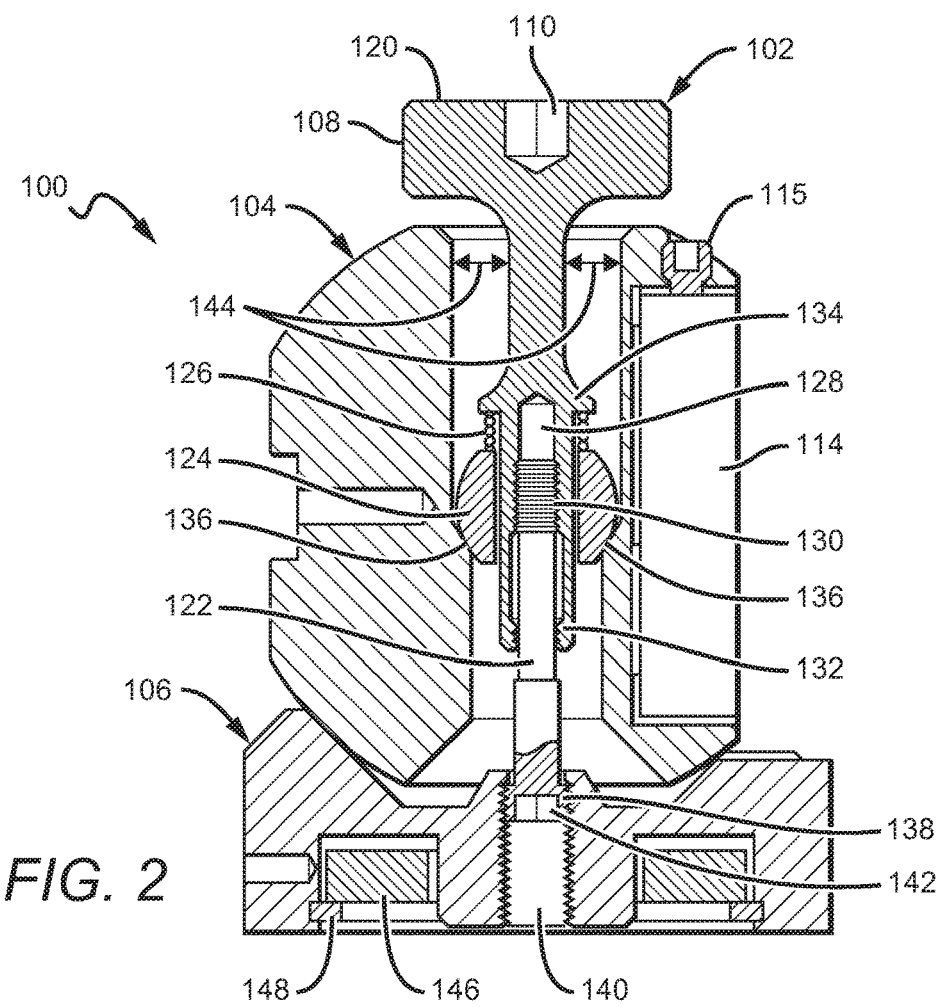
FIG. 2 shows a cutaway view of the kinematic mount shown in FIG. 1.

FIG. 2 shows a cutaway view of the device shown in FIG. 1, showing off the internal components that facilitate locking the housing 104 in place relative to the footing 106. This view also shows all the components of the tightening mechanism 102. The tightening mechanism 102 includes a tightening top 120, an anchor 122, a locking interface component 124, and a spring 126. The tightening mechanism 102 is also shown in FIG. 3.

These components all work together to hold the housing 104 stationary relative to the footing 106. To hold the housing 104 in place relative to the footing 106, a user turns the tightening top 120 (e.g., clockwise or counterclockwise, depending on the threading) by gripping the tightening top 120 and turning. The tightening top 120 includes a hollow portion 128 therein that has interior threading that interacts with exterior threading 130 on the anchor 122 that is sized and dimensioned to fit within the tightening top 120.

In some embodiments, anchor 122 includes exterior threading 130 on only a portion of its length. This design is intended to make it more difficult to accidentally disassemble the kinematic mirror holder 100. In such embodiments, like the one shown in FIG. 2, the tip 132 of the tightening top 120 includes internal threads identical to the internal threads that mate with the exterior threading 130 of the anchor 122. Thus, when assembling some embodiments of the kinematic mount of the inventive subject matter, the interior threaded portion at the tip 132 of the tightening top 120 first screws down past the exterior threads 130 of the anchor 122. There is then a space separating the threads in the tip 132 from the interior threads shown mated with the exterior threads 130 of the anchor 122. If a user were to accidentally unscrew the tightening top 120 too far, the threaded tip of the anchor 102 would rest in the gap between interior threads in the tightening top 120, thus making accidental disassembly more difficult.

To hold the housing 104 in place relative to the footing 106, the tightening mechanism 102 includes a locking interface component 124. The locking interface component 124 can be spherical, semi-spherical, or otherwise have a sloped surface that interacts with a sloped surface inside the housing that allows the housing to be rotated while resting within the footing 106. In FIG. 2, the locking interface component 124 is mostly spherical, with a hole through it that the tightening top 120 can pass through. Above the locking interface component 124 is a compression spring 126 that contacts both a flanged portion 134 of the tightening top 120 as well as the locking interface component 124. As the tightening top 120 is turned, the flange 134 applies pressure to the spring 126, in turn compressing the spring 126, and the spring 126 thus applies increasing force against the locking interface component 124. The locking interface component 124 is thus pressed against the sloped surfaces 136 inside the housing 104. The sloped surfaces 136 can be formed as a continuous surface that creates a sloped ring, or, in some embodiments, the sloped surfaces can be discontinuous, e.g., segmented.

As the tightening top 120 is turned, pressure builds between the locking interface mechanism 124 and the sloped surfaces 136, which in turn presses the housing 104 down into the footing 106. Eventually, as the tightening mechanism 102 is tightened down, friction forces between the locking interface component 124 and the sloped surfaces 136 within the housing 104, as well as friction forces between the housing 104 and the footing 102, become high enough that accidental movement of the housing 104 relative to the footing 106 becomes unlikely to occur, resulting in the housing 104 being held (or "locked") into place relative to the footing 106.

In some embodiments, the locking interface component 124 is made from a plastic, but it can alternatively be made from one or any combination of, e.g., a metal (e.g., stainless steel), an alloy, a composite, a rubber, etc. In some embodiments, the locking interface component 124 can be made from one material and have a coating of another material. For example, it can be made from a metal and include a rubber or rubber-like coating, or it can be made from a metal and have a different metal deposited on its surface. These different variations can affect the coefficient of friction between a locking interface component and the sloped surfaces of a housing.

The tightening mechanism 102 is designed such that turning the tightening top 120 to lock the housing 104 in place relative to the footing 106 has no (or very little) effect on the housing's position relative to the footing 106. For example, if a laser is pointed at mirror 114 and that laser is reflected onto a distant surface, the housing 104 can be adjusted (e.g., by hand or by an accompanying adjustment tool) to change where the laser is pointed. When the laser is pointed to a desired location, the kinematic mirror mount 100 can be tightened by rotating the tightening top 120. Because of the design disclosed in this application, rotating the tightening top 120 will not discernably change the position of the laser light at its ultimate destination after reflection. This represents a huge improvement over the prior art by facilitating quick and easy adjustment without concern for how tightening the mount might affect the angular position of the mirror held in the mount.

The anchor 122 of the tightening mechanism 102 comes up through an anchor opening 140 (seen best in FIGS. 4 and 5) in the footing 106. Because the anchor 122 has a flared base 138, it cannot pass all the way through the anchor opening 140 in the footing 106, and the flared base 138 creates the anchor 122 that the tightening top 120 pulls against to lock the housing 104 in position relative to the footing 106. The anchor 122 can include, e.g., an intrusion 142 to accommodate a hex key. In some embodiments, anchor opening 140 includes internal threading, and flared base 138 includes external threading. To prevent the anchor 122 from being screwed straight through the anchor opening 140, anchor opening 140 includes a lip at the top that is narrower than the anchor 138. In some embodiments, the anchor opening 140 can be configured as a locknut or it can incorporate a locknut therein to help prevent the flared base of the anchor 122 from coming loose. In embodiments where the tightening mechanism 102 pulls against the anchor 122, the system behaves like an elongated jam nut upon tightening.

Prior to locking the housing 104 in place relative to the footing 106, the housing 104, as mentioned above, can have its position adjusted. The housing 104 can be freely rotated within the footing 106 when the tightening mechanism 102. Rotation of the housing 104 occurs about the center of curvature of the portion of the housing 104 that interacts with the footing 106. This center of curvature, in some embodiments, coincides with the position of the locking interface component 124 when the kinematic mount is fully assembled. In embodiments like the one shown in the Figures where the housing 104 is mostly spherical and the locking interface component 124 is also mostly spherical, by positioning the locking interface component 124 within the housing 104 such that it rests at the previously-described center of curvature with the locking interface component's also resting at that center of curvature, the housing 104 rotates (e.g., can be manually repositioned) in any way about that point.

The diameter of the shaft creating a through-hole in the housing 104 is wider at the top than at the bottom, as seen best in FIG. 2. There are a variety of reasons for this, several of which are enumerated here, though this is not an exhaustive list. First, a wider top portion enables easy assembly by allowing the locking interface mechanism 124 to slide into position from the top of the housing 104 without requiring any assembly or disassembly of the housing itself. Second, having a wider top portion joined with a narrower bottom portion creates a transition having sloped surfaces 136 that interact with the locking interface component 124 to allow for both rotational movement as well as facilitating the locking behavior that arises by tightening the tightening mechanism 102. Third, having a wider upper portion allows for greater rotational freedom. For example, gaps 144 constrain how much the housing 104 can rotate until the walls of the internal shaft run into the top portion of the tightening mechanism 102.

In some embodiments, the housing 104 may not be spherical about the entirety of its outer surface, but to facilitate the types of rotational repositioning (e.g., any rotation about a center of curvature in any direction) that are possible with the embodiment shown in the Figures, at a minimum the bottom surface of the housing 104 can be spherical where it contacts the footing 106 with the locking interface component 124 located at the center of curvature for spherical portions of the bottom surface of the housing that interact with the footing. As mentioned above, different housing bottom shapes can bring about different types of movements or restrict rotations to certain axes, etc.

Figure 5:
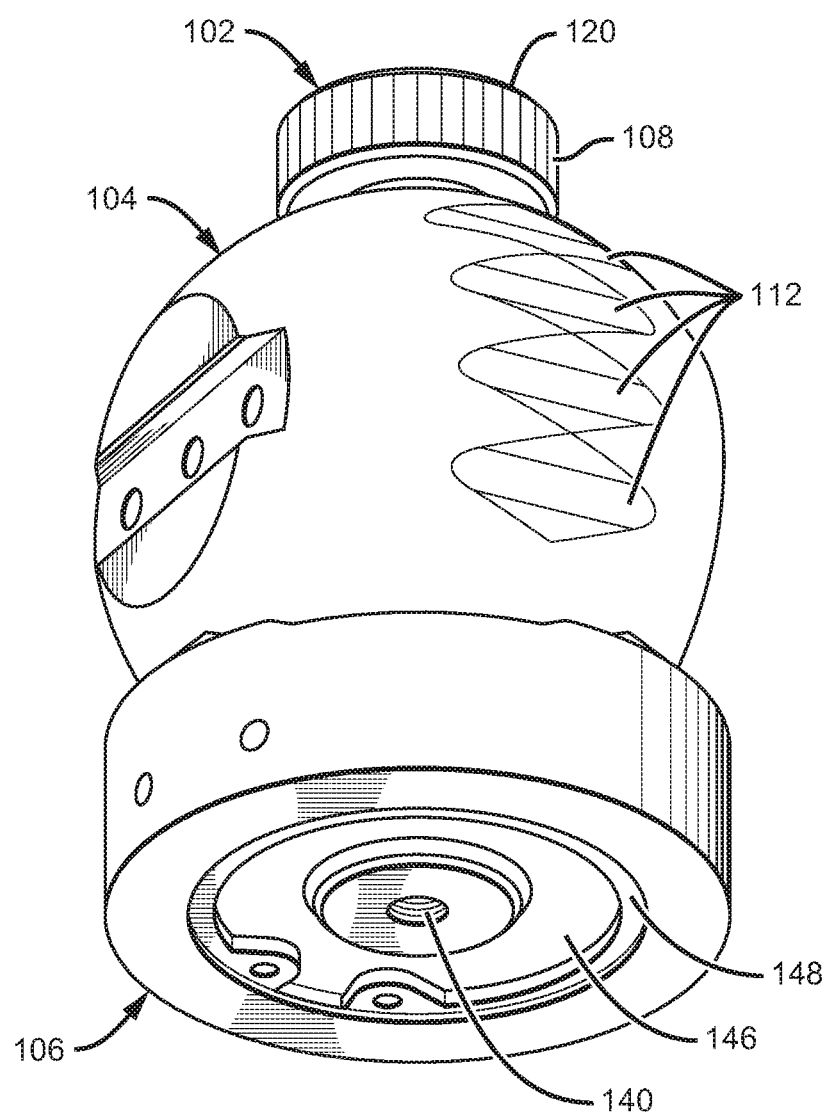
FIG. 5 shows a bottom, perspective view of the kinematic mount shown in FIG. 1.

In some embodiments, kinematic mirror mounts of the inventive subject matter can include a magnet in the bottom of the footing. For example, FIGS. 4 and 5 show a ring-shaped magnet 146 that fits within a space in the bottom of the footing 106. The ring-shaped magnet 146 is held in place by a magnet retainer 148. The ring-shaped magnet can hold the kinematic mirror mount to, e.g., a prototyping board or any other object or surface made from a material that can be subject to induced magnetization.

Thus, specific kinematic mirror mounts have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A kinematic mount comprising:
   a housing comprising a curved outer surface on at least a bottom portion of the housing, and further comprising a housing through hole;
   a footing comprising a cradle that is sized and dimensioned for the curved outer surface of the housing to rest within the cradle;
   a tightening mechanism disposed at least partially within the housing through hole, the tightening mechanism comprising a top portion, a bottom portion, a locking interface component, and a compression spring;
   wherein the tightening mechanism is configured to hold the housing in place relative to the footing upon tightening the top portion to the bottom portion with the spring and the locking interface component disposed on the top portion such that the locking interface component contacts both the top portion and an interior surface of the housing to apply pressure on the interior surface toward the footing.

2. The kinematic mount of claim 1, wherein the locking interface component comprises a curved outer surface.

3. The kinematic mount of claim 1, wherein the top portion comprises a hollow tip with internal threading and the bottom portion comprises a threaded tip configured to screw into the hollow tip.

4. The kinematic mount of claim 1, wherein the top portion comprises a flared portion between a first end and a second end, the flared portion configured to apply force to the compression spring upon tightening the tightening mechanism.

5. The kinematic mount of claim 4, wherein the compression spring is configured such that an inner diameter of the spring is greater than the outer diameter of the hollow tip, and wherein the spring is positioned between the flared portion and the locking interface component.

6. The kinematic mount of claim 1, wherein the locking interface component contacts at least one interior surface of the housing as well as the compression spring.

7. The kinematic mount of claim 1, wherein the housing comprises a space for a mirror.

8. A kinematic mount comprising:
   a housing comprising a curved outer surface on at least a bottom portion of the housing, and further comprising a housing through hole;
   a footing comprising a cradle that is sized and dimensioned for the curved outer surface of the housing to rest within the cradle;
   a tightening mechanism configured to fit within the housing through hole, the tightening mechanism comprising a top portion, a bottom portion, a locking interface component, and a compression spring;
   the top portion comprising a hollow tip with internal threading and a flared portion between a first end and a second end of the top portion;
   the bottom portion comprising a threaded tip sized and dimensioned to couple with the internal threading of the hollow tip of the top portion;

the locking interface component comprising a through hole having a diameter that is greater than an outer diameter of the hollow tip, and wherein the locking interface component is placed on the hollow tip such that the hollow tip passes through it;

wherein the locking interface component contacts at least one interior surface of the housing; and the compression spring configured such that an inner diameter of the spring is greater than the outer diameter of the hollow tip, and wherein the spring is positioned between the flared portion and the locking interface component.

9. The kinematic mount of claim 8, wherein the top portion further comprises a flared end to facilitate hand tightening.

10. The kinematic mount of claim 8, wherein the footing further comprises a through hole sized and dimensioned to allow the bottom portion to pass through it.

11. The kinematic mount of claim 10, wherein the bottom portion further comprises a flared end to hold it in place relative to the footing.

12. The kinematic mount of claim 8, wherein the compression spring comprises a coil spring.

13. The kinematic mount of claim 8, wherein the locking interface mechanism's outer surface is curved.

14. The kinematic mount of claim 8, wherein the locking interface mechanism's curved outer surface is a portion of a sphere.

15. The kinematic mount of claim 8, wherein the housing comprises a space for a mirror.

* * * * *